United States Patent [19]

Johnson

[11] 4,278,388
[45] Jul. 14, 1981

[54] PIVOTAL ROLLER MOUNTING SYSTEM

[76] Inventor: Lawrence N. Johnson, West 130 Highdrive, Spokane, Wash. 99203

[21] Appl. No.: 43,501

[22] Filed: May 29, 1979

[51] Int. Cl.³ ............................................. B60P 3/10
[52] U.S. Cl. ................................. 414/534; 280/414 R
[58] Field of Search .............. 414/529, 532, 533, 534, 414/535; 280/414 R

[56] References Cited

U.S. PATENT DOCUMENTS

| 2,816,672 | 12/1957 | Facchini | 414/534 |
| 3,029,960 | 4/1962 | Evans | 414/531 X |
| 3,155,249 | 11/1964 | Johnson | 414/534 |

Primary Examiner—Robert G. Sheridan
Attorney, Agent, or Firm—August E. Roehrig, Jr.

[57] ABSTRACT

A support assembly for support of a boat on a trailer including a support arm pivotally mounted to the trailer at a lower end and carrying one or more boat hull contacting elements at its upper end. The pivotal movement of the support arm permits the boat hull contacting elements to move laterally toward and away from the longitudinal centerline of the trailer to increase the efficiency of transport, storing, loading and unloading of a boat trailer.

14 Claims, 9 Drawing Figures

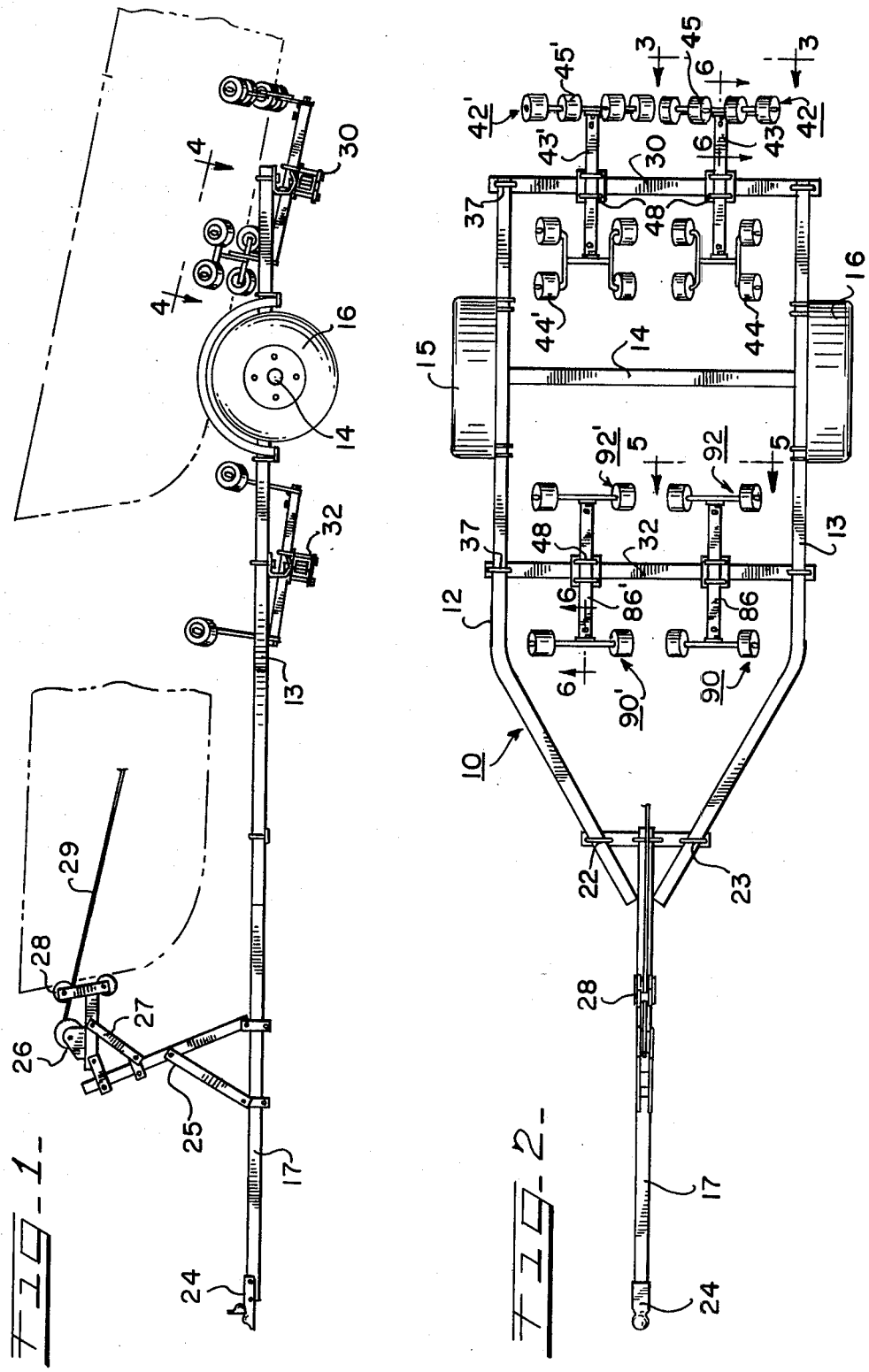

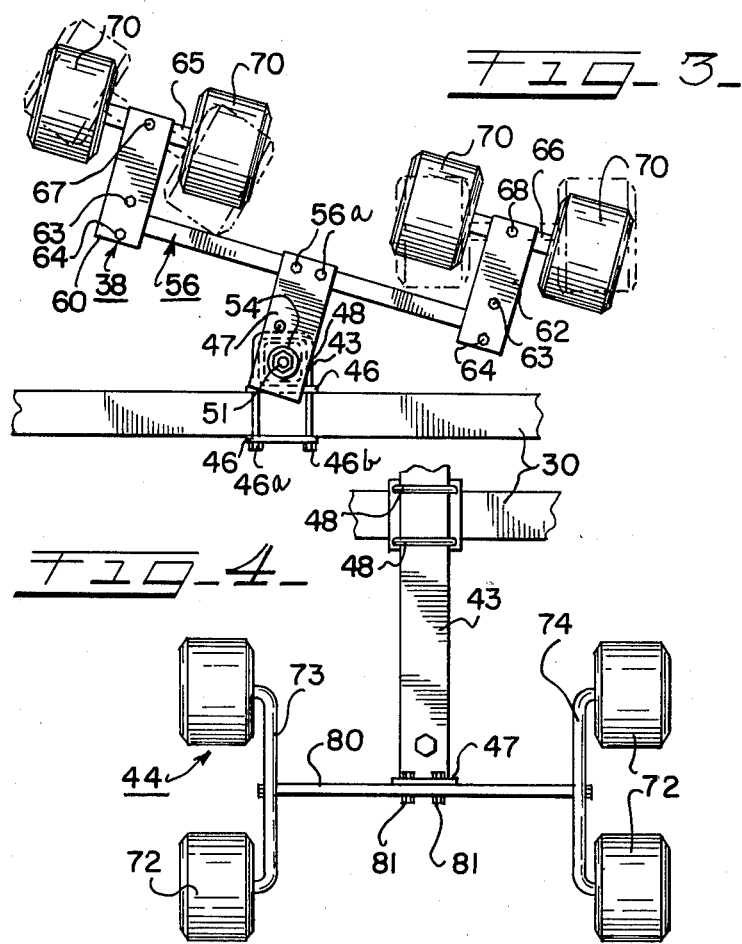
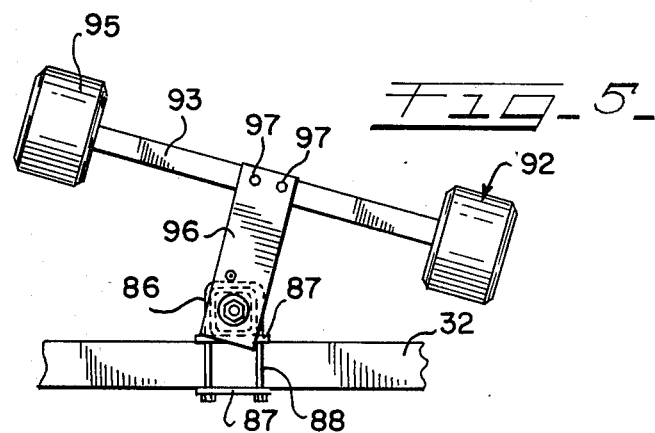

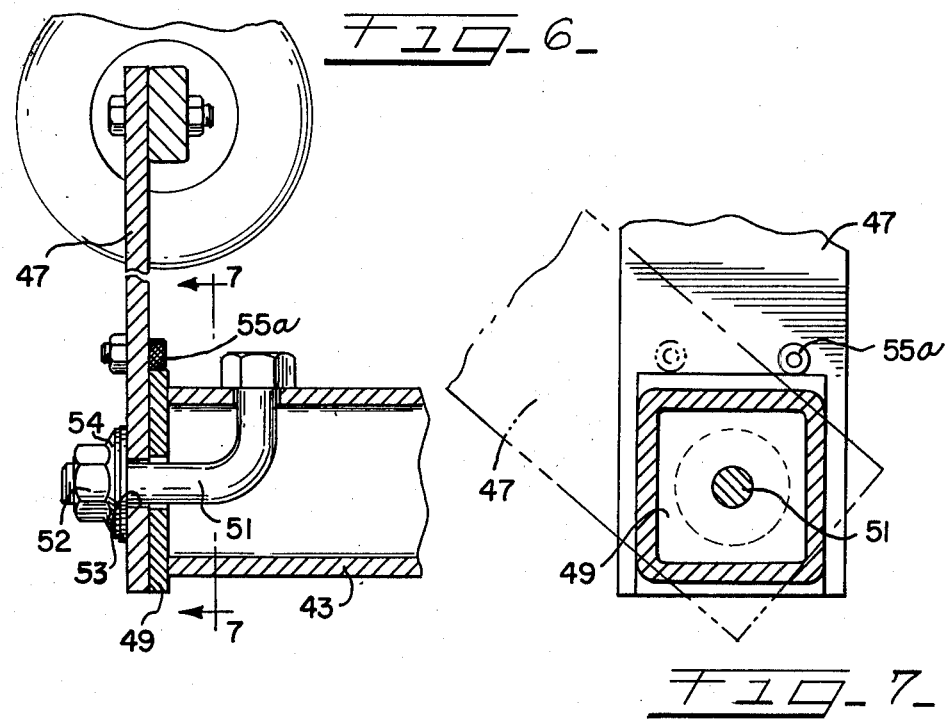
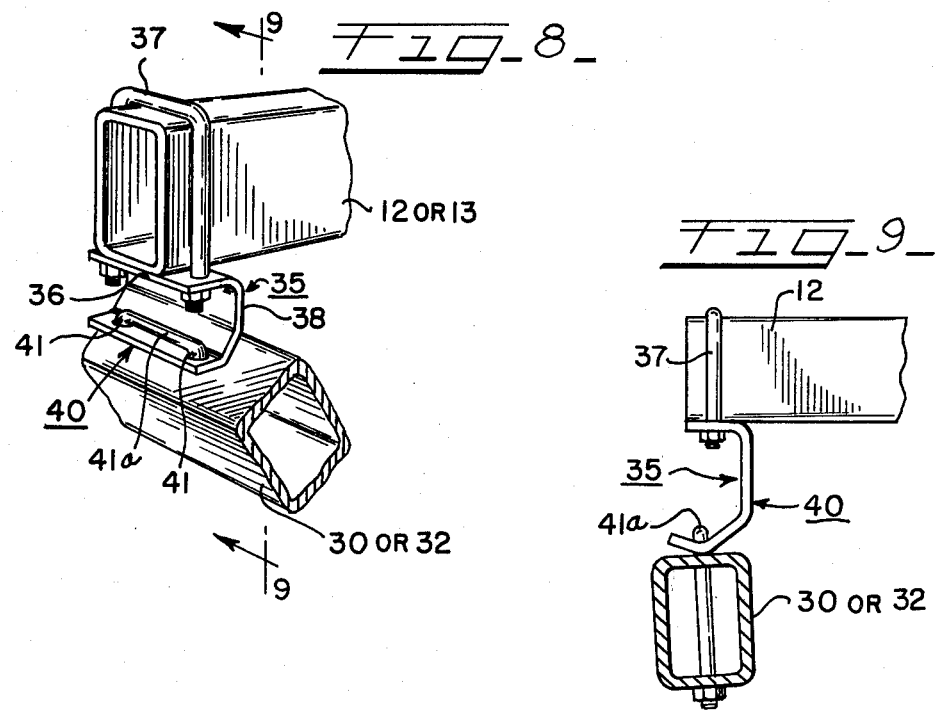

PIVOTAL ROLLER MOUNTING SYSTEM

BACKGROUND OF THE INVENTION

This invention relates in general to boat trailers and, in particular, to an improved roller support assembly for use in conjunction with such boat transporting and storage vehicles.

More specifically, but without restriction to that particular use which is shown and described, this invention relates to a roller support assembly which improves the support of boats being transported or stored on a trailer. The roller support assembly herein disclosed not only maintains a boat on a loaded trailer with superior effectiveness, but further facilitates its loading and unloading.

Boat trailers have achieved increasing popularity in recent years due to the convenience and mobility they provide for transporting and storing boats of various designs on land with the capacity of being launched and loaded from the water as desired. To achieve such versatility, it is well recognized that a boat trailer must securely support the boat and that the boat supporting elements on the trailer conform to the boat hull contour so that pressures exerted thereby are distributed and localized stress, which could result in damage to the hull, are avoided. It is also highly desirable that the support elements couple satisfactory support of a loaded trailer with convenient loading and unloading characteristics.

In the prior art some boat trailers have employed self-adjusting all-roller techniques by which the rollers contacting the hull are so mounted to follow the changing contours of the hull of the boat when it is being launched or loaded to and from the water. One type of a boat trailer utilizing a self-adjusting all-roller construction to achieve overall improved operational characteristics is manufactured and sold under the trademark "EZ LOADER." Although such trailers sold under the trademark provide highly effective results in supporting a boat during transport or storage or while loading or unloading, it has been found that their self-adjusting roller assembly design can further be improved to increase the efficiency of support of the boat on the trailer.

The boat carrying capability of such self-adjusting, all-roller trailers can be optimized by moving the pivot support point of the roller assembly outward from the longitudinal centerline of the boat trailer at a vertical height well under the position of the rollers. Such lowering and outward positioning of the pivot point results in the boat being carried by the trailer with its center of gravity closer to the ground to increase the stability of the trailer while being transported on land. The need to vary the pivot point to achieve the lower positioning of the boat with respect to the ground has been necessitated by the proliferation of numerous hull designs for the various types of pleasure boats that a transporting vehicle must accommodate. The increased capability of handling such various designs and still maintaining the boat at the lowest feasible vertical position on a loaded trailer is therefore a desirable objective to improve existing roller assemblies employed in the prior art.

The previously known technique of support of a boat cannot optimumly achieve such lowered support while at the same time insuring the hull of the boat clears, during loading or unloading, one or more of the cross members which are positioned between the booms creating the bed of the trailer. Moreover, the retention of a boat at the lowest possible position on a trailer facilitates unloading of the boat into shallow water, when desired, as well as increasing the convenience by which the boat is reloaded onto the trailer. Thus, the prior art all-roller trailers are deficient in permitting a boat to be readily loaded or unloaded from a trailer and at the same time permitting the boat to assume, during cradling on a trailer, an optimum lowermost position relative to the ground.

SUMMARY OF THE INVENTION

It is, therefore, an object of the present invention to improve boat trailers.

It is another object of this invention to shift the pivot point of a boat support assembly on a trailer outward from the centerline of the boat trailer.

Another object of this invention is to support a boat hull on a trailer bed at an optimumly lowermost position relative thereto.

Still another object of this invention is to facilitate loading and unloading of a boat without contact with structural elements of the trailer bed.

These and other objects are attained in accordance with the present invention wherein there is provided a boat trailer having a hull contacting support assembly which is coupled to the trailer bed by means of a support arm for pivoting movement. The increased arc of movement provided by the support assembly of the invention permits the pivot point thereof to be optimized outward from the longitudinal centerline of the trailer so as to mount hulls having different types of varying configurations for superior support in a lowermost position on the trailer frame. The support arms of the assembly of the invention simultaneously may carry a plurality of hull contacting elements which are self-adjusting in nature to contact and maintain in cradling position hulls of various configurations.

DESCRIPTION OF THE DRAWINGS

Further objects of the invention together with additional features contributing thereto and advantages acruing therefrom will be apparent from the following description of a preferred embodiment of the invention which is shown in the accompanying drawings with like reference numerals indicating corresponding parts throughout, wherein:

FIG. 1 is a side elevation of a boat trailer which embodies the improved support structure of the invention illustrated with a trailer being shown with a shallow draft type boat being indicated in phantom lines in two positions, one at the start of loading and the other at a fully loaded position;

FIG. 2 is a plan view of the trailer structure shown in FIG. 1;

FIG. 3 is an elevational view, to an enlarged scale, showing the novel roller support structure of the invention at the trailing end of the trailer, the view taken on the line 3—3 of FIG. 2;

FIG. 4 is a plan view, to an enlarged scale, showing the paired double roller arrangement of the boat support structure of the invention at the trailing end of the trailer, the view being taken on the line 4—4 of FIG. 1;

FIG. 5 is an elevational view, to an enlarged scale, showing the hull engaging roller arrangement of the invention at the forward or leading end of the trailer, the view being taken on the line 5—5 of FIG. 2;

FIG. 6 is a sectional view, to an enlarged scale, taken along line 6—6 of FIG. 2;

FIG. 7 is a sectional view, to an enlarged scale, taken along line 7—7 of FIG. 6;

FIG. 8 is a fragmentary perspective view showing the pivot connection between the cross members and the longitudinally extending frame side booms of the trailers shown in FIGS. 1 and 2; and FIG. 9 is a fragmentary sectional view on a slightly reduced scale taken on the line 9—9 of FIG. 8.

DESCRIPTION OF THE PREFERRED EMBODIMENT OF THE INVENTION

Although not intended to be so limited, for convenience of illustration, the improved self-adjusting, roller support structure of the invention is shown in connection with a trailer for loading and hauling or supporting a low or shallow draft type boat. The illustrated trailer construction enables the boat to be loaded directly from the water by backing the trailer down a ramp or incline and bringing the rearmost hull engagement roller assemblies into position close to the boat. The boat is then advanced into contact with the roller assembly and drawn forward into supporting engagement with the rearmost hull engaging roller assemblies.

The trailer is readily adapted for convenient loading of boats as shown and is so designed that the basic trailer frame structure accommodates a considerable variation in size and hull configuration. The roller support structure of the invention can also be utilized with other trailers such as, for example, trailers suitable to support a deep draft or shoal draft type boat, such as a sail boat with a deep keel, or in other trailer configurations in which the improved support and loading characteristics of the invention are desired.

In the trailer arrangements shown in FIGS. 1 to 9, the basic frame structure 10 comprises laterally spaced, elongated side frame members or booms, 12 and 13, arranged as major portions in parallel relation and having bolted thereto an axle 14 and springs (not shown) which are longitudinally adjustable relative to the side boom or frame members. On the opposite ends of the axle 14 are wheels 15, 16, each of which is partially covered by an associated fender. While a single axle arrangement is shown, a double axle tandem axle arrangement may be used, either of which may be moved along the side booms 12 and 13, to obtain a desired total weight distribution that is known to those skilled in the art.

The forward ends of the longitudinal side frame members 12, 13 have portions which converge toward each other to terminate on opposite sides of a tongue 17. The tongue 17 extends along the longitudinal centerline of the trailer frame, with the trailing end secured by a U-bolt 18 to a short tongue-to-boom yoke 20 which has its opposite end secured by U-bolts 22, 23 adjacent the ends of the side frame members 12 and 13. The forward end of the tongue 17 has mounted thereon a hitch coupler 24 for connection to a cooperating connecting element on a powered vehicle used for pulling the trailer. An upstanding, substantially inverted Y-shaped, winch stand 25 is carried on the tongue 17, which is adjustable fore, aft, and vertically, and supports at its upper end a manually or power operated winch 26. The winch 26 is mounted on a frame assembly 27 which extends in a direction of the rear or trailing end of the trailer. The frame assembly 27 also supports a bow-engaging roller stop assembly 28 provided for steadying the bow end of the boat when in a fully loaded position during its transport. The winch 26 includes a cable 29 with means for attaching a free end to the bow of the boat for drawing the boat onto the roller assembly supports of the invention.

The trailer side frame members or booms 12, 13 are laterally spaced by cross bar members 30 and 32, which are pivotally supported therefrom. In the form illustrated, which is arranged for supporting a shallow draft power boat thereon, the cross bar member 30 is mounted near the trailing end of the trailer, while cross bar member 32 is spaced forwardly thereof. The position and spacing of these members lengthwise on the trailer will depend upon the weight distribution of the boat to be carried.

The pivotal cross bar members 30 and 32, which laterally space the side booms 12 and 13 for forming the basic trailer structure are pivotally mounted at their opposite ends on the side frame bars 12 and 13 in an identical manner so as to enable them to tilt or pivot within predetermined limits about axes extending transversely of the frame to facilitate loading the boat directly from or into the water. The pivot mounting in the form illustrated on the trailer in FIGS. 1 and 2 is shown in FIGS. 6 and 7, and comprises a connecting bracket member 35 of relatively short length and substantially C-shaped in cross section. The bracket 35 is formed with a top plate-like portion 36 adapted to seat on the bottom surface of the side rail 12 or 13, and to be held in position by U-bolt assembly 37 which encompasses the boom member. This mounting permits ready adjustment of the position of the cross bar member 30 or 32 along the length of the side rails.

The bracket 35 has a wall section or portion 38 depending from the edge of the top portion 36 and extending substantially vertically therefrom to a bottom section 40 of a bi-planar curved cross section in which a pair of bolt holes 41 are provided to receive a U-bolt element 41a having its leg portions extending through the top and bottom walls of the cross member 30 or 32. The bolt holes are sufficiently large in diameter, relative to the cross sectional diameter of the bolt member 41a, to permit tilting or turning of the cross member 30 or 32, within a predetermined range of swinging or pivoting movement about an axis extending transversely of the trailer frame.

The cross bar members 30 and 32 carry the hull engaging roller assemblies of the invention which are in the arrangement illustrated, in paired relation with the assemblies of each pair thereof, in the form illustrated, being arranged on opposite sides of the longitudinal centerline of the trailer. Since the details of the assembly of each pair thereof are identical, the elements on one side of the assembly which correspond to the elements on the other side will be identified by the same numerals primed. For the purpose of illustration, different types of roller assemblies may be carried by the cross bar members 30 and 32 as shown. However, normally the same type of roller configuration is employed throughout the trailer with the particular type of configuration depending upon the capacity of the trailer.

The rearmost cross bar member 30, in the form shown, carries hull engaging roller assemblies 42 and 42' of the identical construction which are shown spaced equally on opposite sides of the longitudinal line of the trailer and mounted for novel pivotal movement about parallel axes extending longitudinally of the trailer frame (FIG. 3). These assemblies 42, 42' comprise support members 43, 43' of relatively short length which are mounted in parallel, transversely spaced relation on the cross bar member 30 and carry at their fore and aft ends pivotally mounted, hull engaging roller sub-assemblies 44, 45, and 44', 45'.

As shown in FIGS. 2, 3, 4, 6, and 7, the member 43 is in the form of a roller supporting, longitudinally extending tube, which is mounted on the cross frame bar 30 by means of a pair of spaced plates 46 respectively bearing against the top and bottom of cross frame bar 30. Plates 46 each include a pair of holes 46a and 46b positioned fore and aft of the plate to receive the legs of a pair of U-bolts 48, embracing member 43 to affix it to cross frame bar 30. The holes 46a and 46b are punched in plate 46 in close tolerances to the lateral surfaces of the cross frame bar 30 to insure minimum swing of the member 43 in its lateral position relative to cross bar member 30. The vertical height of member 43 can easily be adjusted by the insertion of one or more shims (not shown) between the bottom of member 43 and the upper surface of bar 30 as should be readily apparent to one skilled in the art.

The tube member 43 has a roller assembly 44 mounted at its forward end and a roller assembly 45 mounted at its trailing end for pivotal movement about substantially the longitudinal axis of the tube member 43. The roller assemblies 44 and 45 are mounted for pivotal movement by means of a support arm or plate 47 affixed to the open forward and aft ends of tube member 43. Each of the support arms 47 are mounted for pivotal movement about the axis of tube member 43 by means of a pair of plates 49 positioned adjacent to the forward and aft ends of tube members 43 through which an angle bolt 51 extends outward through a bolt hole in plate 49 and a corresponding bolt hole 53 in support arm 47. The angle bolt 51 includes a head bearing on tube 43 to which a shaft extends downward passing through a hole provided in the upper surface of tube member 43 and curves outward to extend along the axis of tube 43. A nut 52 retains the support arm and plate to tube 43 as best shown in FIGS. 6 and 7. Thus, the angle bolt is retained to tube 43 and provides a shaft about which the support arm 47 can rotate. To better permit rotation of the support arms, a conventional washer 54 may be positioned between the nut of the angle bolt and the outer surface of the support arms. As best shown in FIG. 7, a stop 55a in the form of a shaft extending through a hole in the support arm 47, is formed on the side of each support arm 47 to limit the outboard pivotal movement of the roller assemblies away from each other to facilitate drawing a boat onto the trailer.

A cross bar assembly 56 is coupled to the upper end of each of the support arms 47 by any suitable technique such as by a pair of bolts 56a. The cross bar assembly 56 has mounted on each of the outwardly extending ends thereof pairs of clamp plates 60 and 62 which are secured by means of bolts 63 and 64 so as to be readily adjustable along the length of the bar 56. At their uppermost ends the clamp plates 60 and 62 have relatively short length pivotal axle forming members 65 and 66 mounted thereon by means of pivot bolts 67, 68. The axle members 65, 66 carry, at their opposite ends, hull engaging rollers 70 which are mounted for free rotation thereon and which are pivotal about pivot bolts 67, 68 on an axis parallel to the pivotal axis of the support arm 47 about the spaced axis created by the angle bolt 51. This arrangement, as heretofore described, provides adjustability of the position of the rollers 70 relative to the bar members 56 and facilitates continuous engagement of the boat hull at all contact points to evenly distribute the weight during launching, loading, or transport through a multi-planar and/or compound pivotal action.

From the foregoing, it should be apparent that the pivotally secured support arm 47 produces an arcuate motion of cross bar assembly 56 with rollers 70 about an axis formed along tube member 43. Such improved mounting supports the roller assembly at a greater spaced distance from the longitudinal centerline of the trailer permitting rollers 70 to contact a hull during transport and storing at an optimum lower position so as to provide greater lateral stability of the boat on the trailer. This increase in lateral stability by the support assembly of the invention is achieved with the capability of the support rollers being able to "close the gap" or maintain contact with the configuration of the hull as it moves past rollers 70 during loading or launching. By closing the gap, rollers 70 and the rollers to be described later are able to prevent the bow or keel of a boat from contacting the cross bar member of the trailer frame because the lower pivot point mounting of arm 47 swings the rollers farther inward towards the center during launching. Thus, by shifting the pivot point of the roller assembly farther outward and lower on the frame, better transport, loading, and launching characteristics are achieved.

In the trailer as illustrated in FIGS. 1 through 9, the roller arrangement 44 at the other end of support tube 43 is of a somewhat different construction even though it is supported for pivotal movement by an identical support arm 47. As pointed out previously, the roller assembly at either end of support 43 will normally be identical for even distribution of weight per roller. The particular roller assembly employed, single, multiple, or quad, will depend on the weight capacity of the trailer. As shown in FIG. 4, the multiple roller assembly 44 has been found particularly suitable for use with power boats in order to accommodate strakes. The roller assembly 44 comprises a pair of hull engaging rollers 72 which are mounted for free rotation on axle forming ends of bar members 73, 74. The bar members 73, 74 are secured for predetermined pivotal movement by means of a small pivot (not shown) intermediate their ends about a supporting bar 80 which is suitably mounted on support arm 47 such as by bolts 81. Arm 47 is in turn secured for pivotal movement about the axis of tube 43 in the manner described with reference to the roller assembly of FIG. 3.

At the forward or leading end of the trailer, FIGS. 1 and 2, a cross bar member 32 (FIGS. 2 and 5) is swingably or pivotally mounted on the side boom or frame members 12 and 13 in the same manner as cross bar 30. The cross bar 32 has mounted thereon in generally parallel relation, transversely spaced, longitudinally extending roller support tubes 86, 86'. The tubes 86, 86' are of relatively short length and are secured to the cross bar in the same manner as the support tubes 43, 43' such as by plates 87 and U-bolt 88 (FIG. 5).

The support tubes 86, 86' carry, at the opposite ends, hull engaging roller assemblies 90, 92 and 90', 92' of identical construction. As shown in FIG. 5, the roller assembly 92 comprises cross bar 93 having hull engaging rollers 95 journaled, for free rotation, on their axle forming outer ends. The cross bar 93 is secured to support arm 96 by a pair of bolts 97. The lower end of support arm 96 is secured to the forward and aft ends of cross bars 93 and 94 for pivotal movement along the axis thereof in the same manner as previously described with reference to the assembly shown in FIG. 3. This mounting in the manner previously described, facilitates the roller assembly 92, maintaining continuous engagement with the boat hull where the rollers freely rotate as the boat is loaded and unloaded. The pivot point of the roller assembly is shifted outward at the lowermost position on the trailer to accomplish the improved results of the invention in accordance with the foregoing description.

The use of pivotal support arms of the roller assemblies as described herein permits the positioning of the rollers for each of the assemblies to be vertically altered simply by replacing the existing support arm with shorter or longer length arms as the conditions warrant.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A boat support assembly for use on a boat trailer having a cross bar extending transversely across the longitudinal axis of the trailer comprising
   pivotal connection forming means adapted to engage the cross bar of a trailer for forming a pivotal connection thereat for boat hull engaging means such that the boat hull engaging means can pivot relative to a longitudinal axis of the trailer about the point of pivotal connection with the cross bar,
   boat hull engaging means carried by said pivotal connection forming means for supporting a boat thereupon, and
   support arm means interconnecting said pivotal connection forming means and said boat hull engaging means,
   said support arm means being pivotally connected to said pivotal connection forming means for free pivotal movement of said support arm and said boat hull engaging means connected thereto in a plane transverse to the longitudinal axis of the trailer at the pivotal connection with the cross bar.

2. A boat support assembly according to claim 1 wherein said support arm means is rigidly attached to said boat hull engaging means.

3. A boat support assembly according to claim 2 wherein said boat hull engaging means includes at least one roller.

4. A boat support assembly according to claim 3 wherein said boat hull engaging means further includes a roller support means mounting the roller for rotatable movement about a rotational axis substantially normal to the pivotal axis of the support arm.

5. A boat support assembly according to claim 4 wherein said roller support means supports said at least one roller for pivotal movement about another axis normal to said rotational axis.

6. A boat support assembly according to claim 1 wherein said boat hull engaging means is carried on the upper end of the support arm.

7. A boat support assembly according to claim 1 wherein said pivotal connection forming means includes an elongated pivot forming member retaining the support arm for pivotal movement thereabout.

8. A boat support assembly according to claim 7 wherein said elongated member includes angularly disposed portions.

9. A boat support assembly according to claim 7 wherein said pivotal connection forming means includes a tube adapted to be coupled to a cross bar of a trailer.

10. A boat support assembly according to claim 9 wherein the pivotal connection forming means further includes a plate adapted to be attached to an end of said tube and having a bore through which said elongated pivot forming member extends.

11. A boat support assembly according to claim 10 wherein said elongated pivot forming member includes a first portion extending through said support arm and said bore of the plate in a direction parallel to the longitudinal axis of said tube and upward through a bore provided in said tube to retain the support arm for pivotal movement about the longitudinal axis of said first portion of said elongated member.

12. A boat support assembly according to claim 1 wherein said support arm is a flat plate.

13. A boat support assembly according to claim 1 wherein said support arm comprises a T-shaped bar having at least one roller rotatably connected at each end of the intersected portion and the end of the intersecting portion opposite the point of intersection being pivotally connected adjacent to the trailer cross bar.

14. A boat support assembly according to claim 13 wherein said T-shaped bar supports at least one T-shaped bar at each end of the intersected portion and the base of each such supported T-shaped bars being pivotally connected thereto and the intersected portions of each such T-shaped bars having at least one roller for pivotal movement about a second axis lying parallel to said rotational axis.

* * * * *